June 23, 1936.  T. W. MILLER  2,044,913
FLUID CENTER ARTICLE
Filed Sept. 19, 1933
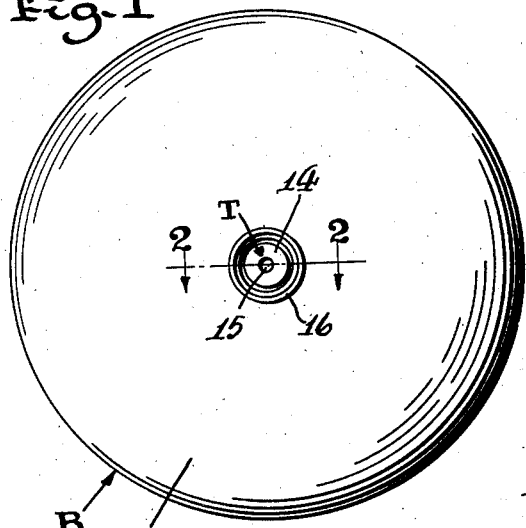
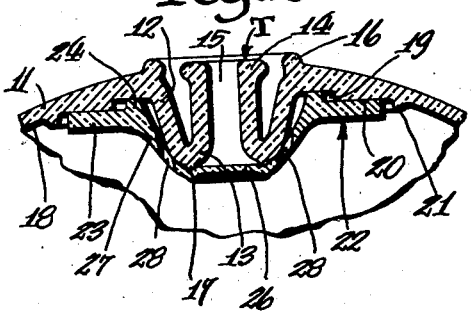
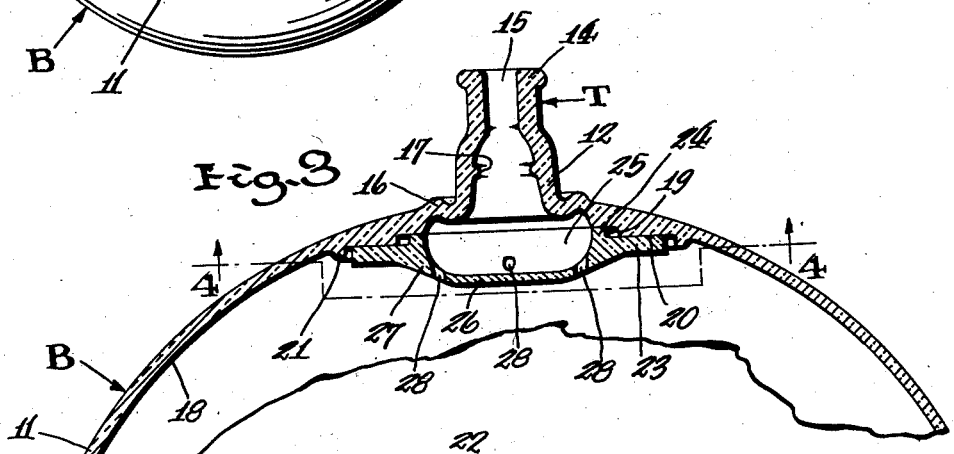
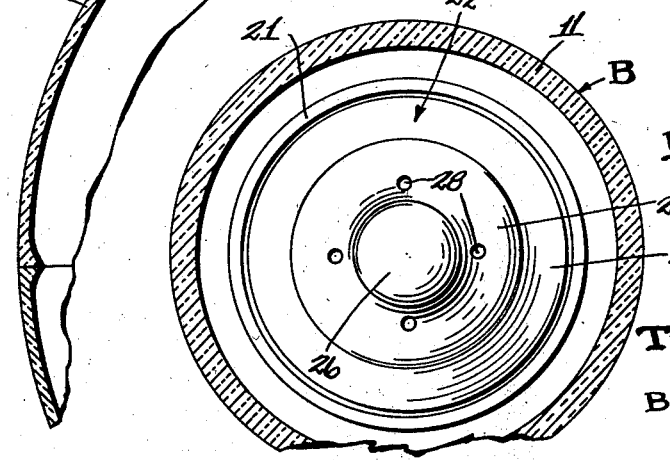
Thomas W. Miller
INVENTOR
BY Freeman & Weidman
ATTORNEYS Patented June 23, 1936

2,044,913

UNITED STATES PATENT OFFICE 2,044,913

FLUID CENTER ARTICLE

Thomas W. Miller, Ashland, Ohio, assignor to The Faultless Rubber Company, Ashland, Ohio, a corporation of Ohio Application September 19, 1933, Serial No. 690,116

11 Claims. (Cl. 273—65)

This invention relates to fluid-center articles, and to a process for making the same, and a principal object of my invention is to provide a new and improved article of this type, and a new and improved process for making the same.

In the drawing accompanying this specification, and forming part of this application, I have shown, for purpose of illustration, one form which my invention may assume, and in this drawing:

Figure 1 is an elevational view of the embodiment of my invention selected for illustration, Figure 2 is a fragmentary sectional view, taken on the line 2—2 of Figure 1, showing the valve structure in closed position, Figure 3 is a fragmentary sectional view, similar to Figure 2, but showing the valve structure in open position, while Figure 4 is a fragmentary sectional view, corresponding substantially to the line 4—4 of Figure 3.

My invention is shown herein in the form of a fluid-center play ball B having a flexible fluid-tight envelope 11 and an inflating tube T preferably formed integral with the envelope 11. The inflating tube T comprises an inwardly extending section 12 connected to the base of a nipple section 14 by a connecting section 13 preferably integral with both the inwardly-extending section 12 and the nipple section 14. The nipple section 14 is provided with a bore 15, is doubled back and extended outwardly centrally through the section 12, and has its free end substantially flush with a shallow rib 16 provided on the exterior of the envelope 11 surrounding the inflating tube structure, as best shown in Figure 2.

Adjacent the section 12 the inner surface 18 of the envelope 11 is provided with an annular groove 19 forming a surrounding shoulder 20 at the outer periphery of which is a circumferential bead 21 which merges with the inner surface 18 of the envelope.

A cup-shaped valve member 22, formed of rubber or other suitable material, is provided with an annular flange portion 23 which is vulcanized or otherwise attached to the shoulder 20 of the envelope 11, and with an annular bead 24 extending into the groove 19 of the envelope 11 to additionally seal the valve member 22 to the envelope 11. The inner periphery of the bead 24 defines the mouth of a cup-like portion 25, having a substantially flat base 26 and a curved wall 27, formed of relatively thin rubber, and provided in the wall 27 with apertures 28 affording communication between the bore 15 and the interior of the envelope 11.

The inwardly-extending section 12, the connecting section 13, and the nipple section 14, are formed in the retracted position shown in Figure 2, and accordingly, normally assume this retracted position, but these portions may be flexed outwardly to extended position, as shown in Figure 3. However, they may be sprung back into the normal position by the application of a very slight force.

With the inflating tube T extended outwardly of the envelope 11, as shown in Figure 3, the apertures 28 formed in the valve member 22 are unobstructed, and afford communication between the bore 15 and the interior of the envelope 11, whereby gas or any other suitable fluid means may be admitted to the envelope 11, but with the tube T in the retracted position, as shown in Figure 2, the connecting section 13 of the inflating tube T contacts the base 26 of the valve member 22, to effectively seal the envelope 11.

To improve the seal the parts of the inflating tube T may be proportioned to somewhat extend the valve member 22, to put the valve member 22 in tension, and also, the connecting section 13 of the inflating tube T may be provided with a special sealing surface, such as the rib 17.

In carrying out the process of making the improved fluid-center article, the envelope 11 may be molded of resilient material, and in a plurality of parts, one provided with the inflating tube, formed in retracted position, as shown in Figure 2, and the other complementary to the one, to complete the article. The valve member 22 is then cemented to the shoulder 20, and the parts of the envelope are then secured together, as by cementing, to provide the fluid-tight article.

To inflate the article the inflating tube T is withdrawn into the position outwardly of the envelope 11, as shown in Figure 3, opening the valve, and the extended nipple section 14 is placed in the mouth, and air blown into the ball, until the desired pressure has been secured, whereupon the free end of the nipple section 14 may be tipped by the tongue, to cause it to snap to closed position, as shown in Figure 2, thus closing the valve, and sealing the envelope.

From the foregoing it will be obvious that an article constructed according to my invention may be re-inflated from time to time, to restore the desired fluid pressure, and thus to maintain the article always live, and accordingly, that my invention obviates the difficulty heretofore present in articles of this type, that the articles soon become dead by loss of fluid, and thereafter cannot be revived by any satisfactory method.

Also, articles constructed according to my invention may be shipped to the dealer deflated, and inflated by the dealer, with a saving in the cost of transportation.

Further, by reason of the fact that the fluid pressure may be maintained at the desired value, the fluid pressure within the envelope may be relied on to furnish the entire resiliency of the article, in contrast to the situation which heretofore has existed, where the envelope has been relied on for an underlying resiliency, and accordingly, in articles constructed according to my invention the envelope need serve only as a container for the fluid, and may be made much thinner, with a consequent saving in cost of material.

It will be understood that my invention is applicable not merely to play balls, but to fluid center articles generally, and particularly, to footballs, basketballs, bladders, and the like.

From the foregoing it will be obvious to those skilled in the art, that the embodiment of my invention herein shown and described may be variously changed, used, or modified, all without departing from the spirit of my invention or sacrificing the advantages thereof, and it therefore will be understood that the disclosures herein are illustrative only, that my invention embodies advantages and uses other than those particularly pointed out or suggested herein, and that my invention is not limited thereto.

I claim:

1. A fluid center article, comprising: an envelope having its wall interrupted to define an apertured gap portion adapted to be closed by tubular means, said means being retrovertibly telescopic and having communication with the interior of said envelope, and closing said apertured gap portion, said tubular means being extensible to the exterior of said envelope for inflating purposes and being retrovertibly telescopically retractable through said gap to the interior of said envelope, said tubular means being formed of resilient material biased to retain either its extended or retracted positions; said apertured gap portion being cooperable with said tubular means for closing communication with said envelope when said tubular means is retracted.

2. An article of the character described, comprising: an envelope; nipple means secured to said envelope and communicating with the interior of said envelope, said nipple means being constructed and arranged so that portions thereof assume telescoped relation in a retracted position, and including means for biasing said nipple means to said retracted position wherein all of its free portions are disposed generally within the interior of said envelope, said nipple means being extensible to an extended position wherein all of its free portions are generally disposed exteriorly of said envelope and in this position forming tube-like means providing for the admittance of fluid to the interior of said envelope.

3. An article of the character described, comprising: an envelope; nipple means carried by said envelope, said means being extensible to form a tube-like member operable to provide for the admission of fluid to the interior of said envelope, said tube-like member being movable to a retracted position, and in this position portions of said nipple means are disposed in telescoped relation; and valve means cooperable with said nipple means when the same is in retracted position to close off communication with the interior of said envelope.

4. An article of the character described, comprising: an envelope; means communicating with the interior of said envelope, and being movable to an extended position generally beyond the outline of said envelope, and in this position forming a tube-like means to provide for the admission of fluid to the interior of said envelope, said tube-like means being retrovertibly telescopic so that said communicating means is movable to a retracted position generally within the outlines of said envelope; and means cooperable with said communicating means when the same is in retracted position for closing communication with the interior of said envelope.

5. An article of the character described, comprising: an envelope; means communicating with the interior of said envelope, and being movable to an extended position, and in this position forming tube-like means to provide for the admission of fluid to the interior of said envelope, said tube-like means being retrovertibly telescopic and biased so that said communicating means is normally moved to a retracted position; and means cooperable with said communicating means when the same is in retracted position for closing communication with the interior of said envelope.

6. An article of the character described, comprising: an envelope; means communicating with the interior of said envelope, and being movable to an extended position, and in this position forming tube-like means to provide for the admission of fluid to the interior of said envelope, said tube-like means being constructed to telescope so that said communicating means is movable to a retracted position, and said communicating means including means for biasing said communicating means toward extended position, if extended, and toward retracted position, if retracted; and means cooperable with said communicating means when the same is in retracted position for closing communication with the interior of said envelope.

7. An article of the character described, comprising: an envelope; means communicating with the interior of said envelope, and being movable to an extended position, and in this position forming tube-like means to provide for the admission of fluid to the interior of said envelope, said tube-like means being constructed to telescope so that said communicating means is movable to a retracted position, and said communicating means being formed of resilient material, and constructed and arranged to retain either its extended or retracted position; and means cooperable with said communicating means when the same is in retracted position for closing communication with the interior of said envelope.

8. An article of the character described, comprising: an envelope; means communicating with the interior of said envelope, and being movable to an extended position, and in this position forming tube-like means to provide for the admission of fluid to the interior of said envelope, said tube-like means being constructed to telescope so that said communicating means is movable to a retracted position, and said communicating means including means for biasing said communicating means to retracted position; and resilient valve means cooperable with said communicating means when the same is in retracted position for closing communication with the interior of said envelope, said biasing means being operable to cause said communicating means to engage and distend said resilient valve means.

9. An article of the character described, comprising: an envelope; resilient telescopic nipple means communicating with the interior of said envelope and having a free extremity and an extremity secured to said envelope, said nipple means being movable to an extended position to form a tube-like means to provide for the admission of fluid to the interior of said envelope, said nipple means being movable from said extended position to a retracted position wherein portions of said nipple means double-up intermediate the extremities thereof to assume generally telescoped relation; and valve means cooperable with said nipple means when the same is in retracted position, said valve means having a surface engageable with the surface of said nipple means adjacent the doubled-up portions thereof to close off communication with the interior of said envelope.

10. Valve means of the character described, comprising: a first valve member, movable to an extended position to form tube-like means for the passage of fluid, said first valve member being movable from said extended position to a retracted position wherein portions thereof are in telescoped relation; and a second valve member engageable with said first valve member when the same is in retracted position to close off the passage of fluid through said first valve member.

11. Valve means of the character described, comprising: a first valve member, movable to an extended position to form tube-like means for the passage of fluid, said first valve member being movable from said extended position to a retracted position wherein portions thereof are in telescoped relation, and said first valve member being formed of resilient material constructed and arranged to be inherently biased to retracted position; and a second valve member engageable with the first valve member when the same is in retracted position to close off the passage of fluid through said first valve member.

THOMAS W. MILLER.